May 7, 1940. R. I. PIGOTT 2,199,809
BOLT HEAD CONSTRUCTION
Filed Feb. 15, 1938
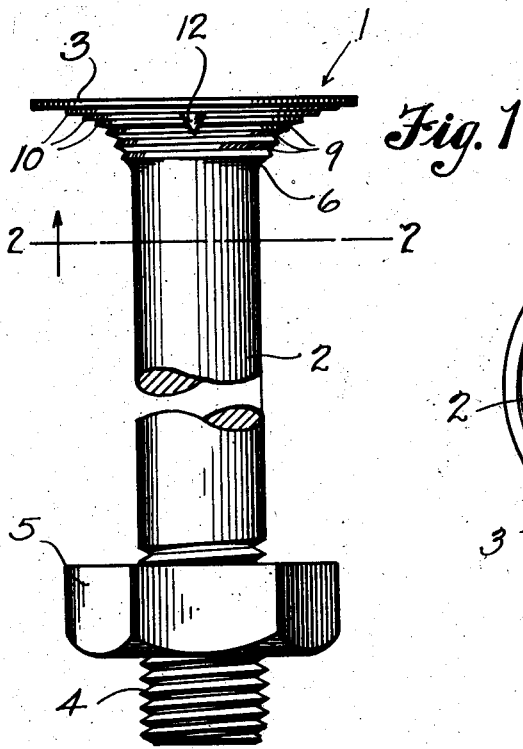
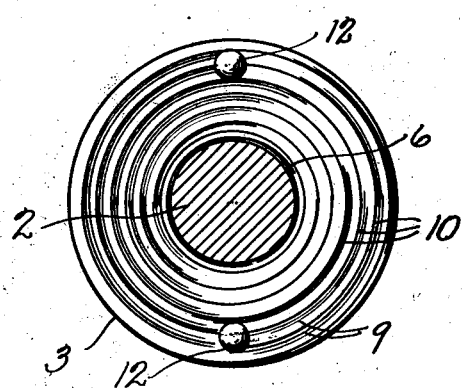
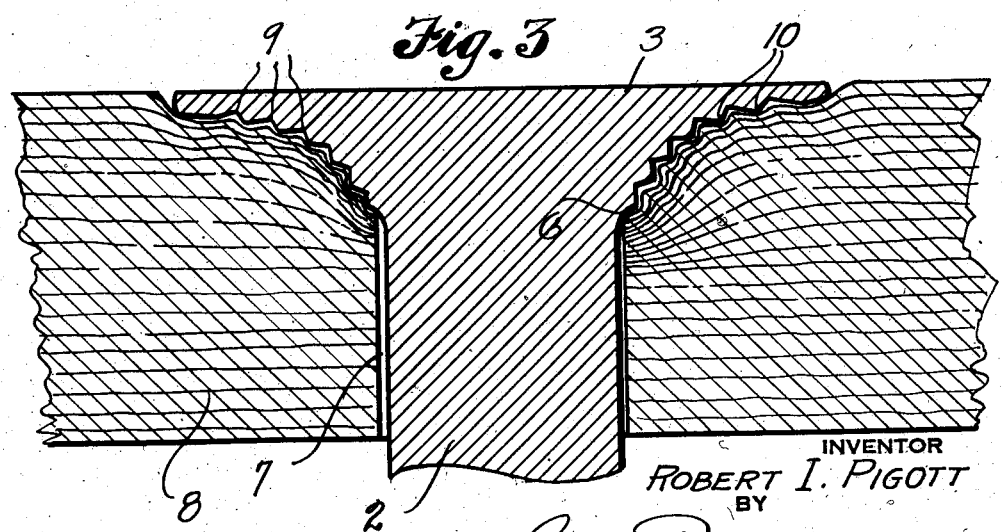
INVENTOR
ROBERT I. PIGOTT
BY
Cook & Robinson ATTORNEY Patented May 7, 1940

2,199,809

UNITED STATES PATENT OFFICE 2,199,809

BOLT HEAD CONSTRUCTION

Robert I. Pigott, Seattle, Wash., assignor to Pacific Coast Forge Company, Seattle, Wash., a corporation of Washington Application February 15, 1938, Serial No. 190,602

1 Claim. (Cl. 85—9)

This invention relates to bolts, and it has reference more particularly to bolts designed for use in wood structures where it is essential, or at least desirable, that the bolt head shall be flush with the surface of the part to which the bolt is applied and that there shall be a substantially water-tight sealing engagement made by the head about the hole provided in the wooden piece for receiving the bolt shank; it being the principal object of this invention to provide a bolt so constructed that, through the usual operation of tightening a nut on the threaded portion of the bolt shank, the bolt head may be drawn down into the wood and into flush surface relationship thereto, without breaking the grain of the wood about or beneath the bolt head.

It is also an object of this invention to provide a bolt of the kind above stated, capable of producing the object above stated, by reason of providing the bolt with a head that is substantially flat on its outer surface, and which is provided over its entire under surface with a succession of comparatively shallow, spirally extending alternating ridges and grooves designed for direct holding contact with the wood surface into which the bolt head is to be drawn; it being understood that by reason of the bolt head being substantially flat, it will be possible to draw it down into the wood surface without necessitating the countersinking about the hole bored to receive the bolt shank, of a hole to receive the bolt head, and by the provision of the succession of relatively shallow alternating grooves and ridges, to insure a frictional holding contact of the bolt head over its entire surface, thus to distribute the forces of compression over an extended area, as differentiated from their being concentrated at any particular locality or within a limited area, and thus to avoid the tendency of breaking the grain of the wood about, or beneath the bolt head, and at the same time to effect a watertight joint between the bolt head and wood surface.

It is a further object of this invention to provide a detail of construction in connection with the bolt shank whereby it is made self-centering in the bore made to receive it, and to provide means whereby the bolt is retained against turning while being drawn into place or while in use.

Explanatory to this invention, it will be here mentioned that U. S. Patent No. 1,830,554, issued to C. E. McMullin on November 3, 1931, describes a bolt having a head portion intended to be drawn into a wood member into flush surface relationship therewith, and wherein the under surface of the bolt head is formed with a rib concentric of the shank, V-shaped in cross section and slightly curved at the apex of the ridge so that when drawn into place, it will form a watertight seal and will not cut the wood. When this particular bolt is applied, the ridge or rib is embedded in a manner whereby to compress and draw the wood inwardly about the bolt shank, thus to form a water-tight joint by reason of the inward wedging action, referred to by the patentee as a "camming action" brought about by the shape of the rib.

The present bolt head construction makes possible the accomplishment of many of the advantages and objects claimed by the above patentee in his invention, and at the same time it avoids certain features which are objectionable; for example, the splitting of the wood about the bolt head that frequently occurs by reason of the relatively long and deep draw that will be made in the wood when the V-shaped rib is caused to be embedded therein; the theory in the present invention being that, by using a plurality of relatively shallow ribs, contiguous to each other and extending over the entire under surface of the bolt head, the draw on the wood is spread over an extended area, as differentiated from being concentrated within narrow limits and therefore there is not the tendency to produce any excessive strain at any one location, nor is the wood drawn at any place to an extent that will cause it to crack or split.

Another object of the invention resides in the formation of a bolt head having a concave under surface, thus to produce a thinner head without loss of bearing area. Also, to provide alternate grooves and ridges over this entire surface by means of a continuous, spirally extending rib.

Other objects of the invention reside in the details of construction of various parts, in the relationship of parts, and in the use of the bolt, as will hereinafter be fully described.

In accomplishing these, and other objects of the invention, I have provided the improved details of construction, the preferred forms of which are illustrated in the accompanying drawing, wherein—

Fig. 1 is a side view of a bolt constructed in accordance with details of the present invention.

Fig. 2 is a cross sectional view, through the bolt shank, as seen on the line 2—2 in Fig. 1.

Fig. 3 is an enlarged, cross sectional view of the head portion of a bolt, illustrating the application of the bolt to a wood piece; this view particularly illustrating the compressing together of the wood, and the sealing effect between the wood piece and the ridged under surface of the bolt head.

Referring more in detail to the drawing—

1 designates, in its entirety, a bolt embodying the present invention, and comprising a shank portion 2 and a head 3. The shank of the bolt may be of any desired length and threaded along its lower end portion, as at 4, to receive the usual type of nut, as designated at 5.

The bolt head 3 is circular in plan, as will be noted by reference to Fig. 2, and is comparatively thin at its peripheral edge. The top surface of the head is preferably flat, and if so desired, may be roughened or knurled in various ways in order that it will better hold mositure of condensation thereon and thus overcome the objectionable results of condensed moisture dripping from the bolt head.

By reference more particularly to Figs. 1 and 3, it will be observed that at the juncture of the bolt shank 2 with the under surface of the head 3, there is a round fillet 6, which insures the self-centering of the bolt shank relative to a hole bored in a wood member to receive it when the bolt is tightened into place; such a hole being designated at 7 in the wood piece 8, shown in Fig. 3, wherein it is observed that the hole is slightly greater in diameter than the diameter of the bolt shank and the fillet effects the centering of the bolt shank in the hole.

The cross section view of the bolt, as seen in Fig. 3, discloses that the annular, contact or bearing surface of the under side of the bolt head is slightly convexed, thus to provide that the head may be made relatively thin to some extent inwardly from its peripheral edge, and will then merge in a gradual curve into the shank portion, thus to avoid any abrupt depressing of the wood adjacent the periphery of the bolt head and thereby overcoming the possibility of causing excessive strain on the wood that would cause cracking of its surface layers about or near the head of the bolt.

The entire under surface of the bolt head is covered by a succession of alternate grooves 9 and ridges 10. These are the result of forming a continuous, V-shaped ridge on this surface that starts adjacent the shank of the bolt and winds spirally about the head in the bearing surface to the periphery thereof, as will be observed by reference to Fig. 2. The succession of contiguous ridges, as observed in Fig. 2, providing the intermediate grooves are of such reduced height or depth as compared to the camming ridge of the previously mentioned patent that individuality they have no appreciable drawing action on the wood fiber, but, acting together, they insure that the entire bearing surface of the head will produce a downward and inward drawing of the wood without any concentrated breaking strain being applied in any limited area.

Also, these ridges provide that the entire under surface of the bolt head will have water-sealed contact with the wood surface, giving the bolt the water-tight feature.

Fig. 3, showing the bolt as applied, is intended to illustrate that there is no concentrated drawing action against the wood surface that will break the grain of the wood, either below or adjacent the bolt head. Also, it shows that the concave formation of the under surface provides a relatively thin head at the peripheral portion making it easier to be drawn flush, but does not reduce the bearing area.

In order that the bolt may be held against turning when applied, I have provided the under side of the head with two conical bosses 12, located at diametrically opposite points in the under side or bearing surface of the head. Preferably, these bosses are located near the periphery of the head.

Bolts of this kind may be made in various sizes, and lengths, and are especially useful in railway car construction, as will be well understood.

Having thus described my invention, what I claim as new therein and desire to secure by Letters Patent is—

A wood bolt comprising a shank threaded at one end to receive a tightening nut, and having a head formed thereon at its opposite end; said head being relatively thin at its periphery and formed with a flat top surface and having an annular concaved bearing surface about the shank extending from the thin peripheral edge below the plane thereof and merging into the shank in an inwardly curved fillet; said bearing surface being formed with a continuous, spirally directed, V-shaped rib of substantial width and relatively shallow depth, and adapted to be pressed into the surface of a wood piece without breaking the grain of the wood, by the tightening of the bolt head thereagainst.

ROBERT I. PIGOTT.